United States Patent Office 3,585,021
Patented June 15, 1971

3,585,021
PROCESS FOR THE PRODUCTION OF AMMONIUM PHOSPHATE CONTAINING FERTILIZERS BY THE REACTION OF AMMONIUM FLUORIDE WITH ALUMINUM PHOSPHATE (FE–14)
Paul R. Geissler, Edison, N.J., assignor to Esso Research and Engineering Company
No Drawing. Filed Apr. 24, 1969, Ser. No. 819,128
Int. Cl. C05b 7/00
U.S. Cl. 71—34                                    16 Claims

ABSTRACT OF THE DISCLOSURE

Reaction of aluminum phosphate with ammonium fluoride, followed by removal of precipitated triammonium aluminum hexafluoride results in the production of an ammonium phosphate fertilizer. Various $N/P_2O_5$ ratios can be obtained by adding acid to the reaction mixture.

PRIOR ART

Ammonium phosphates have gained wide acceptance in recent years as fertilizer materials. Several reasons account for their rapid acceptance. Firstly, from an agricultural standpoint, ammonium phosphates contain both nitrogen and phosphorus in concentrated form. The combined nitrogen and $P_2O_5$ content can approach 65% by weight of the fertilizer in the case of diammonium phosphate. Secondly, the phosphorus is present in ammonium phosphates in a completely water soluble form, which is of great agronomic value. Thirdly, under many conditions, the assimilation of fertilizer phosphate is often increased by the presence of ammoniacal nitrogen, and vice versa.

Ammonium phosphate fertilizers have generally been produced by ammoniating phosphoric acid. However, the overall economic efficiency of that production method depends to large measure on the source of the phosphatic material from which the phosphoric acid is made. This has prompted a search for alternative methods of production wherein cheaper, less pure grades of phosphoric acid or cheaper sources of phosphates could be utilized. This in turn has prompted a search for cheap, naturally occurring phosphatic materials and for methods wherein such naturally occurring materials could be used directly in producing ammonium phosphate fertilizers.

Thus, the various phosphate rock-acidulation processes have been developed wherein a naturally occurring phosphate source, such as phosphate rock containing calcium is mixed with an inorganic acid, such as sulfuric acid, resulting in extraction from the rock of phosphatic materials. In the case of sulfuric acid acidulation of phosphate rock, separation of insoluble impurities from the reaction mixture and subsequent ammoniation results in the production of ammonium phosphate type fertilizers.

Large deposits of aluminum phosphate ore are known to exist in several places throughout the world; notably on Grand Connetable Island, in Brazil, and in Senegal, Africa. Additionally, Florida phosphate deposits contain a layer of material called the leached zone, in which the principal phosphate minerals are aluminum phosphates. This zone overlies the calcium containing phosphate rock matrix, which is presently the most popular natural phosphate source, and has in practice been moved and discarded as waste in phosphate mining operations seeking to reach the commercially valuable calcium containing phosphate rock located below the leached zone. These deposits are a potential source of cheap naturally occurring phosphate which may be utilized to produce phosphate-containing fertilizers.

Various processes for utilizing the phosphate contained in aluminum phosphate ores as a cheap starting material for the production of phosphate containing fertilizers have been developed, but none has proved to be commericially successful.

The simplest of these processes is that wherein the aluminum phosphate ore in subjected to calcination in a rotary kiln, resulting in a product having approximately a 35% $P_2O_5$ content and a 36% aluminum oxide content. The main drawback of this process is that the product formed is water insoluble, although it is soluble in ammonium citrate solution.

The Tennessee Valley Authority (TVA) has done considerable work on leached zone ore and has developed a nitricsulfuric acid extraction process involving calcination of the ore, extraction of the phosphatic materials from the ore with nitric and sulfuric acid, filtration, and ammoniation and granulation of the concentrated filtrate. While producing a complete fertilizer, this process involves such serious filtration difficulties as to make commercialization uneconomical. More importantly, the major part of the phosphatic component is water insoluble.

Several other processes have been investigated including (1) sulfuric acid treatment of aluminum phosphate to produce a superphosphate type fertilizer; (2) sulfuric acid leaching of the ore followed by precipitation of ammonium alum and crystallization of ammonium phosphates; and (3) nitric acid acidulation followed by ammoniation to produce a mixed fertilizer. Again, filtration difficulties are so serious in the acid-leach processes that commercialization is presently uneconomical in the face of competition from the high grade calcium phosphate ores. Some of thes processes also have the disadvantage of producing phosphate fertilizers that are not completely water soluble.

FIELD OF THE INVENTION

This invention relates to a process for the production of ammonium phosphate fertilizers. More particularly, this invention relates to a continuous process for the production of ammonium phosphate fertilizers, wherein the phosphates are produced in a completely water soluble form and in a wide variety of grades from the reaction of aluminum phosphate and ammonium fluoride.

SUMMARY OF THE INVENTION

It has been found that by reacting an aluminum phosphate containing source with stoichiometric or greater amounts of ammonium fluoride, in an aqueous medium, there results a fertilizer composition composed of ammonium phosphate. The present process can best be summarized by the following equation representing the reaction occurring in the process:

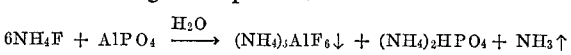

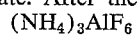

In the practice of the present invention, an aluminum phosphate containing source is reacted with ammonium fluoride to form precipitated $(NH_4)_3AlF_6$, ammonia and diammonium phosphate. After the precipitated $$(NH_4)_3AlF_6$$

has been removed by filtration, the solution can be converted into a fertilizer by any of the conventional methods.

Due to the extreme insolubility of aluminum phosphate ($Ksp = 10^{-30}$ at 25° C.), it had not been thought feasible to utilize aluminum phosphate as a phosphate source in a fertilizer process except under acidulation conditions wherein strong inorganic acids such as sulfuric or nitric acid are utilized to achieve digestion of the insoluble aluminum phosphate and wherein the exothermic heat of reaction further aids in driving the reaction to completion. In this regard, it was thought that, as in the case of fertilizer processes utilizing phosphate rock [$Ca_5(PO_4)_3F$], extraction of the phosphate content of the starting material must proceed by acidulation, and that utilization of a milder coreactant, such as the ammonium fluoride utilized in the present invention, would either not result in reaction at all due to the extreme insolubility of aluminum phosphate, or at most, would result in such a low ammonium phosphate yield as to make the process commercially unfeasible. The prior art process utilizing aluminum sulfate and ammonium fluoride to produce ammonium sulfate containing fertilizers did not offer any encouragement to utilizing aluminum phosphate and ammonium fluoride to produce ammonium phosphate containing fertilizers due to the vast divergence of solubility existent between aluminum sulfate (Ksp=1) and aluminum phosphate (Ksp=$10^{-30}$). Thus, while the reaction of aluminum phosphate and ammonium fluoride to produce ammonium phosphate, as shown by the equation above, is theoretically possible; it was not known whether in practice, the reaction would proceed and further, whether the yield of fertilizer product would make the process commercially feasible.

However, it has been found that the reaction of aluminum phosphate and ammonium fluoride will not only proceed in spite of these difficulties (extreme insolubility and absence of an inorganic acid digesting coreactant); but that the process as such is commercially feasible, resulting in a process yield of approximately 75%. It has further been discovered that by using an excess of ammonium fluoride in a $NH_4F/AlPO_4$ mole ratio of 8 instead of the stoichiometric ratio of 6, the yield is increased. Further, it has been discovered that by adding relatively small amounts of inorganic acid to bring the reaction mixture to a pH of 4–5, the reaction results in the attainment of a nearly theoretical yield.

It is to be noted that the above reaction also results in the production of ammonia. Variations in the resultant product, and thereby variations in the resultant $N/P_2O_5$ ratio, can be achieved by adding inorganic acids to the above reaction to react with the liberated ammonia. In fact, it has been found that the reaction of ammonium fluoride with aluminum phosphate proceeds more readily when a small amount of acid is added to the reacting system. Similarly, the inorganic acid can be added to the filtrate after the removal of the precipitated $(NH_4)_3AlF_6$, or can be added to both the reaction mixture and the said filtrate. Variations in the reaction products within the scope of the present invention include but are not limited by the following equations indicating the scope of variation of the reaction products which is within the contemplation of the present invention:

$$6NH_4F+AlPO_4+H_3PO_4\rightarrow$$
$$(NH_4)_3AlF_6\downarrow+NH_4H_2PO_4+(NH_4)_2HPO_4$$
$$6NH_4F+AlPO_4+2H_3PO_4\rightarrow (NH_4)_3AlF_6\downarrow+3NH_4H_2PO_4$$
$$6NH_4F+AlPO_4+H_2SO_4\rightarrow$$
$$(NH_4)_3AlF_6\downarrow+(NH_4)_2SO_4+NH_4H_2PO_4$$
$$6NH_4F+AlPO_4+HNO_3\rightarrow$$
$$(NH_4)_3AlF_6\downarrow+NH_4NO_3+(NH_4)_2HPO_4$$

Alternatively, HF can be used as the inorganic acid to be added to the reaction system, either as hydrofluoric acid or as ammonium bifluoride according to the equation $NH_4F+HF\rightarrow NH_4HF_2$. When this is done the following reactions typically occur:

(a) $6NH_4F+HF+AlPO_4\rightarrow$
$$(NH_4)_3AlF_6\downarrow+(NH_4)_2HPO_4+NH_4F$$

(b) $4NH_4F+NH_4HF_2+AlPO_4\rightarrow$
$$(NH_4)_3AlF_6\downarrow+(NH_4)_2HPO_4$$

(c) $2NH_4F+2NH_4HF_2+AlPO_4\rightarrow$
$$(NH_4)_3AlF_6\downarrow+NH_4H_2PO_4$$

In this regard it should be noted that the function of the hydrofluoric acid added can vary depending on the specific results desired. Thus, in Equation a above, one mole of HF can be added to neutralize the by-product ammonia; while in Equation b above, the amount of $NH_4F$ utilized to produce diammonium phosphate can be reduced by 1 mole by substitution therefor of 1 mole of HF for 1 mole of $NH_4F$; while yet further, in Equation c above, 2 moles of HF can be substituted for 2 moles of $NH_4F$ where monoammonium phosphate is the desired product. Thus when the present invention is being practiced at a $NH_4F/AlPO_4$ reactant mole ratio of 6, up to ⅓ of the ammonium fluoride to be utilized in the reaction can be replaced by HF or by HF in the ammonium bifluoride form while maintaining the fluorine content at a mole ratio of 6. Thus, it can be seen that the present process provides a method of producing phosphate containing fertilizers wherein the prouduct can have great variation as regards constituents and $N/P_2O_5$ ratios. Additionally, where the product contains a constituent, such as monoammonium phosphate, which can undergo further neutralization by ammoniation, further variation can be achieved by subjecting the filtered reaction mixture to ammoniation.

In a preferred embodiment of the present invention, there is provided a process for the production of ammonium phosphate containing fertilizers comprising (a) reacting an aluminum phosphate containing source with ammonium fluoride in an aqueous medium, (b) filtration of the $(NH_4)_3AlF_6$ formed during the reaction, and (c) recovering from the filtrate the final fertilizer product comprising ammonium phosphate.

In an alternative embodiment of the present invention, the $(NH_4)_3AlF_6$ formed during the reaction in (a) above and filtered off in (b) above can be reacted with an aqueous solution of sodium chloride to produce cryolite, a valuable by-product.

Alternatively, the precipitated $(NH_4)_3AlF_6$ formed during the initial reaction, on separation can be heated so as to cause degradation to $NH_4F$ and $AlF_3$, whereupon the $NH_4F$ can be separated by sublimation and recycled to the aluminum phosphate-ammonium fluoride reactor, thereby reducing the $NH_4F$ requirements of the process by up to 50%.

The ammonium fluoride-aluminum phosphate reaction step is ordinarily conducted in conventional reactor equipment utilizing as a feed;

(1) ammonium fluoride in its usual commercially available form or as a by-product of another process, e.g., phosphate rock acidulation process. The ammonium fluoride is reacted with the aluminum phosphate in a $NH_4F/AlPO_4$ mole ratio of between 6 and 12 preferably between 6 and 8; and water can be added in any amount suitable for maintaining the fluidity of the resultant reaction mixture slurry. Quite obviously, the present process can be operated at $NH_4F/AlPO_4$ mole ratios above 12, however, since near quantitative yield is obtained within the above cited range, such operation is economically unnecessary. As previously mentioned, where it is desired to vary the constituents of the final fertilizer product, acid can be added at this point;

(2) a source of aluminum phosphate such an aluminum phosphate ore.

In general, suitable aluminum phosphate sources include Connetable Island aluminum phosphate ore, Senegal aluminum phosphate ore, Florida leached zone ore, and Brazilian aluminum phosphate ore, as discussed on pages 95 and 96 of "Superphosphate: Its History, Chemistry and Manufacture" published in 1966 by the U.S. Dept. of Agriculture, whose disclosure in this regard is hereby incorporated herein by reference.

The temperatures at which the reaction is usually conducted range from about 50° to 200° F., preferably 75 to about 150° F. at atmospheric pressure. If the reaction is carried out without the addition of acid, it is desirable to provide equipment in order to recover the ammonia evolved.

Upon completion of the ammonium fluoride-aluminum phosphate reaction, the reaction mixture is filtered, and the precipitated $(NH_4)_3AlF_6$ is removed therefrom. Filtration is effected in conventional filtering equipment such as Prayon tilting pans or Dorr-Oliver table filters etc., at filtering temperatures of about 75 to 150° F.

As previously mentioned, the $(NH_4)_3AlF_6$ by-product obtained from the reaction of aluminum phosphate and ammonium fluoride can be utilized in a number of ways.

Thus, where it is sought to reduce to overall process usage of $NH_4F$, the separated $(NH_4)_3AlF_6$ can be heated to a temperature of between 900 and 1100° F. whereupon decomposition ensues resulting in the formation of ammonium fluoride and aluminum fluoride according to the following equation:

$$(NH_4)_3AlF_6 \rightarrow 3NH_4F\uparrow AlF_3$$

The ammonium fluoride is separated from the mixture by sublimation and recycled to the $NH_4F$—$AlPO_4$ reactor along with additional $NH_4F$ introduced from an outside source so as to maintain the desired $NH_4F/AlPO_4$ ratio in the reactor.

Alternatively, the separated $(NH_4)_3AlF_6$ is reacted with an aqueous sodium chloride solution at a temperature between 75 and 150° F. to precipitate cryolite, a valuable byproduct, according to the following equation:

$$(NH_4)_3AlF_6 + 3NaCl \rightarrow Na_3AlF_6\downarrow + 3NH_4Cl$$

The liquid remaining after the separation of the precipitated $(NH_4)_3AlF_6$, containing the fertilizer product is then introduced into conventional apparatus, for example, such as granulator, ammoniator-granulator where applicable, spherodizer, etc., and the final fertilizer product is recovered therefrom in a solid form. Alternatively, the liquid can be concentrated, with additional ammonia added where applicable, and utilized as a fluid fertilizer.

This invention is further illustrated by the following examples, but it is to be understood that they should not be construed as limiting the invention in any manner whatsoever.

EXAMPLES 1–5

Five separate solutions of 25.0 grams of $NH_4F$ in water were prepared and varying amounts of $AlPO_4$ were added to each of the above solutions. To the mixtures in Examples 1, 2, and 3, phosphoric acid was added to adjust the pH to between 4 and 5. No pH adjustment was made with the mixtures in Examples 4 and 5, which resulted in pH values between 7 and 8. All of the reacting mixtures were agitated for one hour at ambient temperatures, filtered, and the resulting filtrates and precipitates were weighed and analyzed for aluminum, fluorine, and phosphate contents. The results obtained are shown in Table I.

crease in fluorine recovery as $(NH_4)_3AlF_6$ with decreasing $NH_4F$ excess is observed. Inasmuch as the recoveries of the three components, i.e., Al, F, and $P_2O_5$, are not optimized at a unique set of reaction conditions the preferred conditions are those which will recover the most valuable components to the greatest degree. Thus, the most preferred reaction conditions may be at a $$NH_4/AlPO_4$$

mole ratio of 6–8 and a pH of 4–5.

EXAMPLES 6–9

In order to illustrate the flexibility or variety possible in the $N/P_2O_5$ grades produced by the instant invention, the following examples are carried out in a manner similar to Examples 4 and 5, except that (1) the indicated amounts of inorganic acids are added to the reaction mixtures, and (2) the filtrates recovered from the separation of solid $(NH_4)_3AlF_6$ are ammoniated to transform any monoammonium phosphate present to diammonium phosphate, and (3) said treated filtrates are evaporated to dryness and analyzed for N and $P_2O_5$ contents. The results are shown below in Table II.

TABLE II

| Example | Moles acid added/mole $AlPO_4$ | Product N | $P_2O_5$ |
| --- | --- | --- | --- |
| 6 | 1/$H_3PO_4$ | 18 | 46 |
| 7 | 1/$H_2SO_4$ | 19 | 23 |
| 8 | 1/$HNO_3$ | 24 | 28 |
| 9 | 2/$HNO_3$ | 26 | 20 |

While the preferred embodiments of this invention have been previously discussed in terms of ammonium phosphate fertilizer production, it is within the purview and contemplation of this invention to incorporate other fertilizer nutrients in the ultimate fertilizer product obtained so as to provide a more complete fertilizer. Such additional nutrients, as for example, KCl, $K_2SO_4$, $KNO_3$, urea, and ammoniated polyphosphate, etc., can be incorporated in the finishing stage of the present process.

From the above, it will be understood that the foregoing description is merely illustrative of preferred embodiments and specific examples of the present invention, and that variations may be made in such embodiments and examples by those skilled in the art without departing from the spirit and purview thereof.

What is claimed is:

1. A process for the production of ammonium phosphate containing fertilizers comprising:

TABLE I.—REACTION PRODUCTS

| Example | Reaction mixture $AlPO_4$ | $NH_4F$ [1] $AlPO_4$ | pH | Grams Al Precipitate | Filtrate | Grams F Precipitate | Filtrate | Grams $P_2O_5$ Precipitate | Filtrate | Percent recovery [2] Al | F | $P_2O_5$ |
| --- | --- | --- | --- | --- | --- | --- | --- | --- | --- | --- | --- | --- |
| 1 | 9.0 | 12 | 4–5 | 2.18 | <.04 | 3.65 | 3.58 | 8.12 | >.080 | 99.1 | 50.5 | 99.0 |
| 2 | 13.5 | 8 | 4–5 | 3.21 | <.06 | 8.66 | 3.83 | 13.91 | >.101 | 98.1 | 69.3 | 99.2 |
| 3 | 18.0 | 6 | 4–5 | 3.95 | .31 | 10.45 | 1.70 | 16.14 | .308 | 92.7 | 86.0 | 98.1 |
| 4 | 13.5 | 8 | 7–8 | 3.45 | .09 | 8.18 | 2.32 | 5.01 | .36 | 97.7 | 77.8 | 93.3 |
| 5 | 18.0 | 6 | 7–8 | 4.43 | .16 | 9.94 | 2.22 | 5.31 | 1.42 | 96.5 | 81.7 | 78.9 |

[1] Mole ratio of $NH_4F$ to $AlPO_4$.
[2] Percent recovery of aluminum and fluorine in $(NH_4)_3AlF_6$ form; and $P_2O_5$ in ammonium phosphate form.

X-ray analyses verified the presence of $(NH_4)_3AlF_6$ in each of the five precipitates, the presence of monoammonium phosphate in the evaporated filtrates from Examples 1, 2 and 3, and the presence of diammonium phosphate in the evaporated filtrate from Examples 4 and 5.

The 50% fluorine recovery in Example 1 is what is expected according to the reaction:

$$6NH_4F + AlPO_4 \rightarrow (NH_4)_3AlF_6\downarrow + (NH_4)_2HPO_4 + NH_3\uparrow$$

since twice the stoichiometric amount of $NH_4F$ was added to the reaction mixture. Accordingly, the expected in- (a) reacting an aluminum phosphate source with ammonium fluoride to produce said ammonium phosphate containing fertilizer and triammonium aluminum hexafluoride; and, (b) removing from the reaction mixture the precipitated triammonium aluminum hexafluoride byproduct.

2. A process according to claim 1 wherein the aluminum phosphate and ammonium fluoride reactants are reacted in a $NH_4F/AlPO_4$ mole ratio of between about 6 and about 12.

3. A process according to claim 1 wherein an inorganic acid is added to the reaction mixture to achieve a reaction mixture if pH of between about 4 and about 5.

4. A process according to claim 1 wherein the $NH_4F/AlPO_4$ mole ratio of the reactants is between about 6 and about 12 and wherein an inorganic acid is added to achieve a reaction mixture pH of between about 4 and about 5.

5. A process according to claim 1 wherein the $F/AlPO_4$ mole ratio of the reactants is about 6 and wherein up to about 1/3 of the amount of F to be utilized has been furnished by HF.

6. A process according to claim 1 wherein the aluminum phosphate source comprises aluminum phosphate containing ore.

7. A process according to claim 1 wherein said reaction is effected at temperatures of between about 50° F. and about 200° F.

8. A process according to claim 1 comprising the additional step of recovering the resultant ammonium phosphate fertilizer from the reaction mixture.

9. A process according to claim 1 comprising adding to the resultant reaction mixture at least one agricultural nutrient material.

10. A process for the production of ammonium phosphate containing fertilizers of different $N/P_2O_5$ ratios comprising:
    (a) reacting aluminum phosphate, ammonium fluoride and an inorganic acid to produce the ammonium phosphate containing fertilizer and triammonium aluminum hexafluoride; and,
    (b) removing from the reaction mixture the precipitated triammonium aluminum hexafluoride byproduct.

11. A process according to claim 10 wherein the $NH_4F/AlPO_4$ mole ratio of the reactants is between about 6 and about 12.

12. A continuous process for the production of ammonium phosphate containing fertilizers comprising:
    (a) reacting an aluminum phosphate source with ammonium fluoride to produce said ammonium phosphate containing fertilizer and triammonium aluminum hexafluoride;
    (b) removing from said reaction mixture the precipitated triammonium aluminum hexafluoride;
    (c) heating the recovered triammonium aluminum hexafluoride to a temperature of between about 900° F. and about 1100° F. to decompose said triammonium aluminum hexafluoride into ammonium fluoride and aluminum fluoride; and,
    (d) recovering therefrom the ammonium fluoride decomposition product.

13. A continuous process according to claim 12 wherein the recovered ammonium fluoride decomposition product is recycled to the aluminum phosphate-ammonium fluoride reacting stage.

14. A continuous process according to claim 13 wherein the $NH_4F/AlPO_4$ mole ratio of the reactants is maintained at a mole ratio of between about 6 and about 12; and wherein the pH of the reaction mixture is maintained between about 4 and about 5 by the addition thereto of an inorganic acid.

15. A continuous process according to claim 13 wherein the resultant ammonium phosphate containing fertilizer is recovered from the filtered reaction mixture.

16. A continuous process for the production of ammonium phosphate containing fertilizers comprising:
    (a) reacting an aluminum phosphate source with ammonium fluoride to produce said ammonium phosphate containing fertilizer and triammonium aluminum hexafluoride;
    (b) removing from said reaction mixture the precipitated triammonium aluminum hexafluoride; and
    (c) reacting the recovered triammonium aluminum hexafluoride with an aqueous solution of sodium chloride, and recovering therefrom $Na_3AlF_6$.

References Cited

UNITED STATES PATENTS 1,300,110   4/1919   Betts _____ 23—88

FOREIGN PATENTS 348,363   5/1930   Great Britain _____ 23—92

REUBEN FRIEDMAN, Primary Examiner

R. BARNES, Assistant Examiner

U.S. Cl. X.R.

71—37; 23—88, 106, 312